United States Patent

Preininger et al.

[15] 3,669,896

[45] June 13, 1972

[54] INORGANIC WHITE PIGMENTS CONTAINING OPTICAL BRIGHTENERS AND PROCESS FOR THEIR MANUFACTURE

[72] Inventors: Erich Preininger, Riehen, Switzerland; Dieter Ging, Huesingen, Germany

[73] Assignee: Ciba-Geigy AG, Basel, Switzerland

[22] Filed: Dec. 2, 1969

[21] Appl. No.: 881,627

[30] Foreign Application Priority Data

Dec. 5, 1968 Switzerland ......................... 18198/68

[52] U.S. Cl. ................... 252/301.3 W, 106/288 R, 106/300, 106/309, 117/33.5 R, 117/100 B
[51] Int. Cl. ......................................... C09k 1/02, C09c 3/00
[58] Field of Search ............. 252/301.2 W; 117/33.5, 100 B; 106/300, 308 Q, 308 N, 309

[56] References Cited

UNITED STATES PATENTS 2,986,528    5/1961    Siegrist et al. ................... 252/301.2 W
3,449,257    6/1969    Tuite et al. ...................... 252/301.3 W

*Primary Examiner*—Robert D. Edmonds
*Attorney*—Harry Goldsmith, Joseph G. Kolodny and Mario A. Monaco

[57] ABSTRACT

The invention concerns a process for the manufacture of inorganic white pigments containing optical brighteners, characterized in that, in an aqueous suspension of an inorganic white pigment which contains a dispersion of at least one optical brightener which is sparingly soluble in water, dispersed by means of non-ionic surface-active agents, property-improving auxiliary substances for such pigments are precipitated or adsorbed on these pigments in a manner which is in itself known by admixing the property-improving auxiliary or admixing the components for the formation of such a property-improving auxiliary if several components for its formation are necessary, and the pigments treated in such manner are separated from the aqueous phase, washed and dried. The invention provides a valuable method for homogeneously distributing optical brightening agents in combination with white pigments in plastics.

8 Claims, No Drawings

INORGANIC WHITE PIGMENTS CONTAINING OPTICAL BRIGHTENERS AND PROCESS FOR THEIR MANUFACTURE

The present invention relates to a process for the manufacture of inorganic white pigments containing optical brighteners, as well as corresponding pigment preparations, and their use for pigmenting plastics.

In pigmenting various industrial products in combination with optical brighteners, for example in the case of plastics, paints, printing inks, paper, spinning compositions and the like, for example in pigmenting with white pigments, the problem of perfect and nevertheless easily manipulated metering of the brightener, and of the avoidance of the introduction of foreign matter, constantly arises. In the case of some industrially important pigments (for example titanium dioxide) there further exists, in the case of mechanical mixtures with brighteners, the danger of gradual demixing as a result of excessive density differences, and a considerable tendency of the organic substance to dusting.

These disadvantages are overcome in accordance with the process of the present invention. This process is characterized in that, in an aqueous suspension of an inorganic white pigment which contains a dispersion of at least one optical brightener which is sparingly soluble in water, dispersed by means of non-ionic surface-active agents, property-improving auxiliary substances for such pigments are precipitated or adsorbed on these pigments in a manner which is in itself known by admixing the property-improving auxiliary or admixing the components for the formation of such a property-improving auxiliary if several components for its formation are necessary, and the pigments treated in such manner are separated from the aqueous phase, washed and dried.

In general this process is carried out in the form that a) optical brighteners which are sparingly soluble in water are dispersed in an aqueous medium by means of non-ionic surface-active agents, b) this dispersion is mixed with the aqueous suspension of an inorganic white pigment, with this white pigment suspension optionally containing a component for the production of property-improving auxiliary substances for the pigments if formation of such property-improving auxiliary substances requires several components, and c) in this mixture of brightener suspension and white pigment suspension, property-improving auxiliary substances are precipitated or adsorbed in a manner which is in itself known, either by admixing a property-improving auxiliary substance or by admixing a further component for the formation of such a property-improving auxiliary substance if one component for the formation of such an auxiliary substance has already been admixed to the optical brightener/pigment dispersion.

By "precipitation" there is to be understood, within the framework of the present invention, both the adsorption of a property-improving auxiliary substance, capable of adsorption, on the white pigment, and also the precipitation of a precipitable property-improving auxiliary substance in the white pigment suspension.

The pigments treated in this way are then worked up in a manner which is in itself customary (filtered and dried), with the working-up procedure of course having to be suited to the brightener property, where required, that is to say, for example, the drying method having to be suited to the heat stability of the brightener.

Further details as to the nature and use of the so-called "-property-improving auxiliary substances" for inorganic white pigments are given below. These auxiliary substances as well as their use in itself are well known and are not claimed within the framework of this invention. However, the use of these property-improving auxiliary substances in the combination of process measures defined above is new. Taking into account the variants which are important in practice, the present invention can hence be defined as a process for the manufacture of preparations of inorganic white pigments by precipitation of property-improving auxiliary agents for such white pigments, these agents being in themselves known, on such white pigments in a manner which is in itself known, separation of the pigment from the aqueous phase, washing and drying, characterized in that a) optical brighteners having a solubility in water of less than 0.5 part by weight per 100 parts by weight of water are dispersed in an aqueous medium by means of non-ionic surface active agents, b) this dispersion is mixed with an aqueous dispersion of an inorganic white pigment of titanium, zinc, aluminum or barium, with the white pigment suspension optionally being allowed to contain components for property-improving auxiliary substances, and c) the property-improving auxiliary substances are precipitated in the mixture thus obtained, in a manner which is in itself known, where required after addition of a further component for the production of the particular auxiliary substance.

On the basis of the previous knowledge as to the post-treatment of white pigments it was not to be foreseen that a dispersion manufactured with the aid of non-ionic wetting agents in the presence of white pigments is separated, through the precipitation of an inorganic or organic substance (as is usually employed for the property-improvement of such white pigments) in such a manner that the optical brightener is practically completely precipitated on the surface of the titanium dioxide. This was surprising since, for example, the adipic acid esters described in German displayed specification 1,277,478 are precipitated on the pigment surface by simple addition to an aqueous suspension of titanium dioxide (rutile), while on the other hand no brightener is precipitated onto the pigment particles from the stable dispersion of the optical brightener in the presence of suspended titanium dioxide. Only through the combination of the two steps, in the manner of the invention, is the industrially interesting effect of a precipitation with simultaneous loose fixing of the optical brightener onto the pigment surface achieved.

In the case of the inorganic post-treatment by precipitation, for example of an aluminum silicate layer, onto the pigment it was also not foreseeable that as a result of the mutual precipitation of an anion with a cation the stable dispersion of the water-insoluble optical brightener produced with the aid of the non-ionic wetting agent is separated in an industrially usable manner and leads to a precipitation with simultaneous loose fixing of the optical brightener on the pigment surface.

This type of fixing manifests itself in the disadvantageous dusting or demixing of a mixture of optical brightener and titanium dioxide no longer being observed, while on the other hand the optical brightener, on incorporation of the preparation into suitable media, exerts its full effect because of the outstandingly uniform distribution.

Within the framework of the present invention, sparingly soluble optical brighteners are to be understood as those which from an industrial point of view are practically barely water-soluble to a significant extent. This corresponds approximately to a solubility of less than 0.5 part by weight of brightener in 100 parts by weight of water (without concomitant substances) at 20° C.

As regards their chemical structure, the compounds which are usable for the present process can belong to the most diverse types, with the restriction that they do not contain any groupings which confer solubility in water (see the above physical condition) and that they — necessarily — do not contain any groups which undergo chemical reactions with the property-improving auxiliary agents.

Amongst the large number of suitable types the following may for example be mentioned (without thereby expressing a restriction): a) thiophene derivatives, b) coumarine derivatives, c) pyrazolines and pyrazoles, d) benz- or naphthazole derivatives, e) stilbene derivatives (for example benzoxazolyl- or triazinylaminostilbenes), f) naphthotriazole derivatives, and g) naphthoxazole derivatives. Optical brighteners of predominant interest are those based on one of the following structural skeletons:

(I) 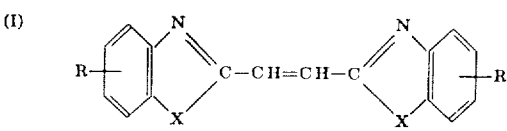

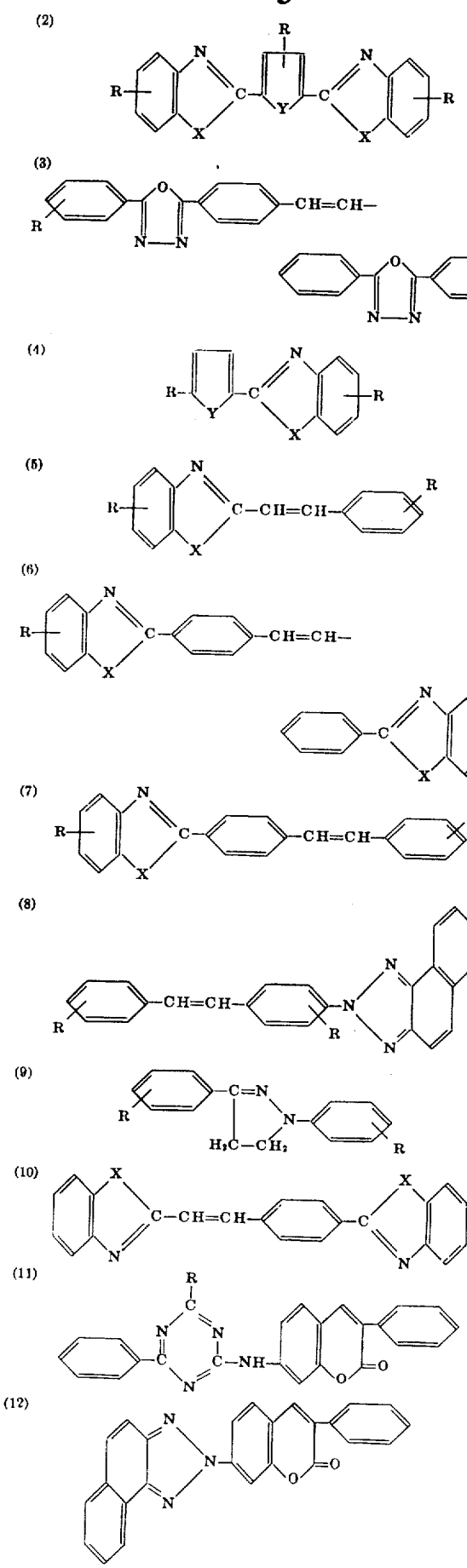
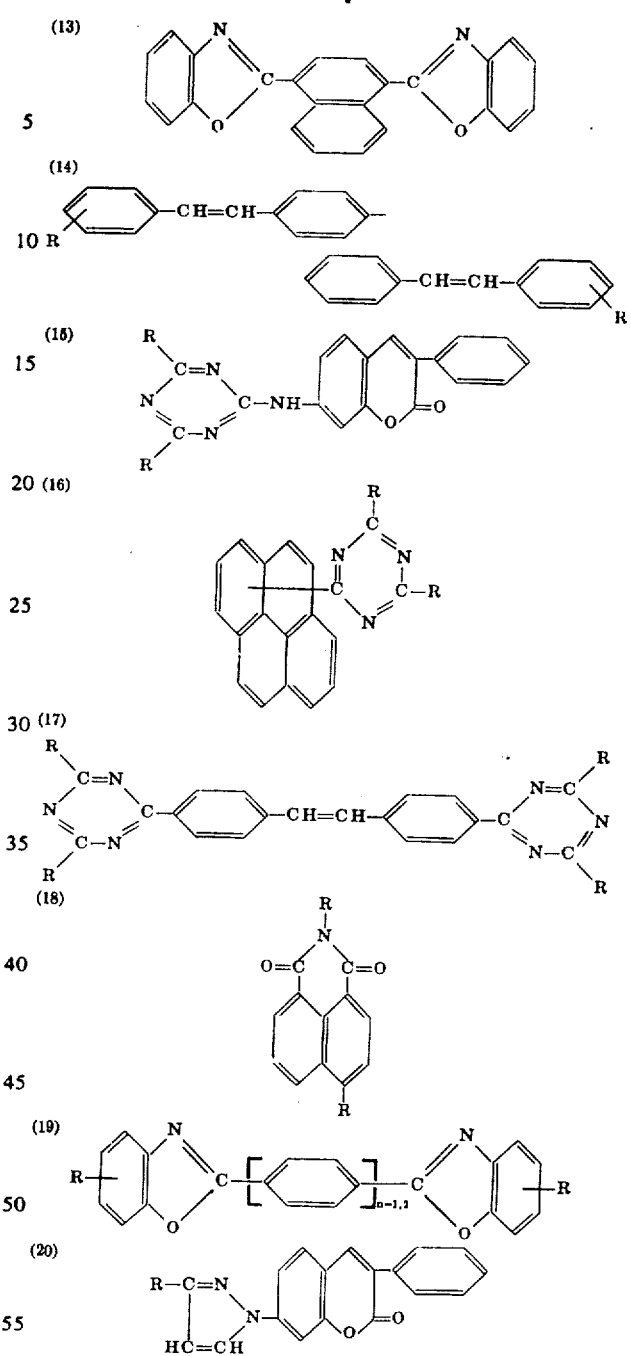

In these formulae the symbol R is intended to indicate generally that hydrogen or a non-chromophoric substituent which does not represent a group conferring solubility in water can occupy this position. From amongst the numerous possibilities, attention is drawn to halogen, alkyl, alkoxy, carbalkoxy, carbalkoxylakyl, aralkyl, aryl (phenyl, diphenyl), fused benzene rings, cycloalkyl, alkylamino, alkylsulphonamido, sulphone and similar groups as well as their substitutive and functional derivatives to the extent that they fulfil the initially posed condition. The symbol X represents an oxygen, sulphur or optionally substituted imino bridge member, whilst Y denotes an oxygen or sulphur atom.

Inorganic pigments to which the present process is applicable or which lend themselves to the manufacture of appropriate preparations are especially oxides, hydroxides, carbonates, sulphates and sulphides of metals of the second main group and sub-group, of the third main group and of group 4a of the periodic system of the elements. As examples there may be mentioned titanium dioxide (rutile and anatase), zinc sulphide, zinc oxide, zirconium oxide, aluminum oxide, silicon dioxide, barium sulphate, magnesium oxide, calcium sulphate, calcium carbonate and their mixtures (for example barium sulphate/zinc sulphide and the like). White pigments of the metals titanium, zinc, aluminum or barium are here of predominant practical interest, but titanium dioxide in the rutile modification and zinc oxide are preferred.

As non-ionic wetting agents it is possible in principle to use the most diverse representatives of this class (see, in this context, Houben-Weyl: Methoden der organischen Chemie (Methods of Organic Chemistry), volume I/2, General Laboratory Practice II, Part 2, pages 124 to 129 and pages 133 to 136). Ethers of polyhydroxy compounds such as polyoxalkylation products of fatty alcohols, fatty acid amides, polyols, mercaptans, aliphatic amines, alkylphenols and alkylnaphthols, alkylmercaptans and alkylarylamines are preferably used. Compounds of practical importance are above all polyoxalkylation products (that is to say reaction products with ethylene oxide) of aliphatic monohydric alcohols or aliphatic amines, in each case having up to 24 carbon atoms, or alkyl-substituted (one to 20 C atoms) phenols.

In order to manufacture the dispersions of optical brighteners, about 0.01 to 5.0, preferably 0.1 to 2.0, parts by weight of non-ionic wetting agent are employed per 1 part by weight of optical brightener, and the mixture adjusted to the most favorable viscosity for wet grinding by adding a suitable amount of water.

By property-improving auxiliary substances for white pigments there are understood those substances which are used in practice for the treatment of pigments in order to improve their industrial usability in one or more respects. These can be auxiliary substances which for example serve to stabilize the pigment against photochemical degradation, to cancel out a photosensitising effect on the substrate, to improve the wettability or dispersibility in various media, to improve the dye receptivity, to improve the gloss, to lower the chemical reactivity, to reduce sedimentation or flocculation tendencies, to improve lipophilic or lyophilic properties and the like. These auxiliary agents can necessarily belong to very diverse classes of chemical substances. As examples of such possibilities of property improvements which are usual in practice, or as examples of the auxiliary substances to be used for this purpose, there may be mentioned: application of a surface layer consisting essentially of aluminum silicate (German displayed specification 1,269,751), or of various metal oxide (hydrate) layers (Belgian patent specification 664,513 and 661,398, U.S. patent specification 3,212,911, French patent specification 1,400,378 and 1,392,413). The precipitation of organic substances, under certain circumstances after the application of an inorganic layer, such as for example described in Belgian patent specifications 656,311 and 638,266 with epoxide compounds, U.S. patent specification 3,172,772, Belgian patent specification 667,738 and French patent specification 1,387,487 with amino compounds, in part in combination with their salts, carboxylic acids, polyhydric alcohols and the like, Belgian patent specification 665,167 with diketone derivatives, French patent specification 1,384,257, German patent specification 1,204,351 and U.S. patent specification 3,198,647 with surface-active agents, and German displayed specification 1,277,478 with neutral dicarboxylic acid esters.

Such methods are particularly suitable for property improvement in the case of the manufacture of marketable titanium dioxide pigments. Frequently used auxiliary substances of inorganic nature are here for example silicates, phosphates, titanates, oxides, hydrated oxides, plumbates, stannates or borates of elements of the second, third and fourth group of the periodic system of the elements (for example of Al, Si, B, Ti, Sb, Zn, Mg, Ce, Su, Pb, Zr, Ca and Ba). Outstanding interest attaches to, for example, silicates of Al and Mg, phosphates of Al and Zn, and oxides and/or hydrated oxides of Zn, Si, Al, Ti, Zr and Ce.

Amongst the organic auxiliary substances the following should be mentioned as being of practical interest:

Diesters of saturated aliphatic dicarboxylic acids, epoxide compounds such as epoxidised oils, epoxidised fatty acid alkyl esters and epoxide resins, benzoic acid, p-aminobenzoic acid and amines such as benzylamine, ethanolamine, diethanolamine, triethanolamine, dipropylamine, monoisopropanolamine or cyclohexylamine, triisopropanolamine, titanate, phosphate or benzoate of triethanolamine or tripropanolamine, diketone compounds such as acetylacetone, benzoylacetone, dibenzoylmethane, ethyl acetoacetate, diethyl malonate, phthalimide, succinimide and 2-acetyl-cyclohexanone, n-propyl gallate, diethyl tartrate, dibutyl tartrate and di-(2-ethylhexyl) tartrate, cyclic acetals or ketals of polyhydric aliphatic alcohols, for example trimethylolpropaneformal, glycerine-acetal, diacetal of pentaerythritol, acetals and polyacetals of dibasic (especially aliphatic) carboxylic acids, alkali salts or ammonium salts of saturated, unsaturated or substituted fatty acids having at least eight carbon atoms, so-called reactive surface-active agents, that is to say urea-formaldehyde or melamine-formaldehyde condensation products modified with hydrophobic or hydrophilic components, these condensation products in themselves exhibiting emulsifier properties but being capable of conversion into an insoluble form by acid catalysis or heating (compare British patent specification 1,022,215, French patent specification 1,381,811 or U.S. patent specification 3,310,416).

Of course organic and inorganic property-improving auxiliary substances can also be used simultaneously or as a mixture.

In accordance with the above explanations, the significant variants of the new process are thus those in which a) optical brighteners having a solubility in water of not more than 0.5 part by weight per 100 parts by weight of water are dispersed in an aqueous medium by means of ethers of polyhydroxy compounds as non-ionic wetting agents, b) this dispersion is mixed with an aqueous suspension of titanium dioxide or zinc sulphide which can optionally contain usual components for property-improving auxiliary substances, and c) property-improving auxiliary substances are precipitated in this mixture, if required after addition of further auxiliary substance components, in a manner which is in itself known.

As the preferred variant, a process should be mentioned which consists of a) an optical brightener from the group of bis-benzoxazolyl-thiophenes, p,p'-bis-(5-phenyl-1,3,4-oxdiazol-2-yl)-stilbenes, p-phenyl-p'-benzoxazolyl-stilbenes, 3-phenyl-carbostyryl derivatives, 1,4-bis-styrylbenzenes, and also bis-triazinyl-stilbenes, bis-styryl-diphenyl derivatives, dibenzimidazolyl-furanes, bis-benzoxazolyl-stilbenes, stilbenyl-naphtho-triazoles or 3-phenyl-7-triazinylamino coumarines having a solubility in water of less than 0.5 part by weight per 100 parts by weight of water being dispersed in an aqueous medium with a polyalkoxylation product of a hydroxy compound as a non-ionic wetting agent, b) this dispersion being mixed with an aqueous suspension of titanium dioxide which can optionally contain components for the property-improving auxiliary substances to be used and c) property-improving auxiliary substances from the group of the silicates, phosphates, oxides and/or hydrated oxides of aluminum, zinc, magnesium, silicon or titanium, or an epoxide compound or a diester of a saturated aliphatic dicarboxylic acid, and also of the alkanolamines, soaps, diketone compounds, polyacetals of dicarboxylic acids or reactive surface-active agents, being precipitated in this mixture.

A method of property improvement which is frequently employed in practice for example consists of precipitating aluminum silicate (for example from sodium silicate and aluminum sulphate) in the presence of $TiO_2$. Equally, the application of dialkyl esters of aliphatic saturated dicarboxylic acids onto $TiO_2$ is of practical interest.

Another interesting process variant consists of carrying out the deposition of the optical brightener after prior application of one or more inorganic precipitations.

The dispersions of the possible optical brighteners should permit a uniform distribution of the inherently water-insoluble optical brightener in the aqueous suspension of the particular pigment, for example titanium dioxide. This aim is achieved by subjecting the optical brightener, which is employed as a crystalline industrially pure substance, to a grinding process with a non-ionic wetting agent in the aqueous phase. The success of the grinding process can be ascertained in various ways. A microscopic investigation of a sample of the ground material represents the simplest qualitative check. The determination of the particle size distribution, for example using the instrument known by the name of "Coulter Counter," gives numerical indication values as to the proportion of coarser brightener particles.

In order to prevent the sedimentation of the optical brightener, auxiliary agents can be added to the dispersion. Here care should be taken that these agents do not unfavorably influence the technical properties of the white pigment preparation in respect of its use. The viscosity of the dispersion can for example be increased with the aid of the sodium salt of a copolymer of 80 parts of methacrylic acid and 20 parts of methacrylic acid methyl ester (acid number of the polymer 410 to 430) to the point that a stiff paste is obtained in which concentration differences in optical brightener through sedimentation can no longer establish themselves.

According to the procedure of the present invention a very uniform distribution of the optical brightener on the treated pigment is achieved, and this on the other hand signifies a high accuracy of metering of the brightener when pigmenting with brightener pigment combinations. This is especially of considerable significance in optical brighteners of high activity. The fixing of the brightener onto the pigment is in any case so firm that dusting thereof for practical purposes does not occur. The manufacture of such preparations is furthermore also very economical because the fixing of the brightener to the pigment can be carried out in the same process step as that to which the pigment is usually in any case subjected in order to improve the use properties.

The preparations manufactured according to the present process can contain from 0.1 to 15 percent, preferably from 1.0 to 10.0 percent (relative to pigment substance) of optical brightener. These concentrations are appropriately so adjusted when manufacturing the preparations that when they are used to manufacture white-pigmented brightened articles the amount of optical brightener which according to experience is required to achieve a maximum white effect is reliably present in the mixture. If a degree of whiteness which is below the maximum achievable degree of whiteness is to be set up, the preparation containing the optical brightener can be extended in any desired ratio with commercially available white pigment. The metering of the optical brightener as a result becomes extremely simple and is restricted to the measures which have become accepted in industry when metering the white pigment. Automatic continuous metering, the manufacture of white concentrates ("masterbatch") or of batches to be ground for lacquers can be carried out in what is otherwise the usual manner.

The white pigments obtainable according to the present process can be used for the most diverse purposes, for example in pigmenting plastics of the most diverse kind (mouldings, fibers or films), in the paint industry (dispersion paints, glue paints, oil paints or varnishes) and in the paper industry, for example also for papers for photographic and electrophotographic materials, and also for the production of printing inks or leather coating colors or for the manufacture of white-pigmented sheets, films, foils, mouldings or fibers for which purpose these white pigments can be added to the compression moulding, casting or spinning compositions used for the manufacture of these structures or can be incorporated into structures which have already been formed such as for example films, foils and strips, or can be employed, together with suitable binders, for surface treatment, for example for coatings. Pure, brilliant, light-fast white effects can thereby be achieved.

The present invention thus at the same time includes a process which serves for the manufacture of plastics from polymerization, polycondensation or polyaddition products, of industrial products containing such plastics and of papers which contain inorganic white pigments and water-insoluble optical brighteners incorporated in them. This process consists of incorporating pigment preparations, such as are obtained according to the process described above, into these plastics, products containing plastics or papers, before, during or after the polymerization, polycondensation or polyaddition or manufacture of the paper.

Preferably, this process is practised in the form that white pigment preparations such as are defined in more detail above are incorporated into plastics based on polyesters, polyamides, polyacrylonitrile, polystyrene, cellulose esters or ethers, polyurethanes, rubbers, acrylonitrile-butadiene-styrene copolymers, polyvinyl chloride as well as their copolymers, before they are finally shaped.

In the examples which follow the parts denote parts by weight and the percentages denote percentages by weight.

MANUFACTURING INSTRUCTIONS FOR BRIGHTENER PASTES

A. (Dispersion A)

A paste consisting of 4 parts of the optical brightener of formula (21)

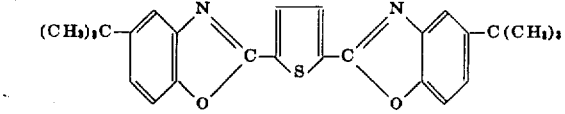

and 3 parts of a 10 percent strength aqueous solution of a non-ionic wetting agent obtained by addition of 7 mols of ethylene oxide to 1 mol of 4-octylphenol was ground at 100 revolutions on a paint grinding machine (Hoover Automatic Muller system) in which a paste is ground between two rotating loaded glass plates. The optical brightener could by means of this paste, be distributed in an extremely fine form in a large excess of water.

B. (Dispersion B)

25 parts of deionised water, 8 parts of a 5 percent strength aqueous solution of the sodium salt of a copolymer of 80 parts of methacrylic acid and 20 parts of methacrylic acid methyl ester having an acid number of 410 to 430, 33 parts of a non-ionic wetting agent obtained by addition of 25 mols of ethylene oxide to 1 mol of stearyl alcohol and 1 part of an aqueous solution of formaldehyde were initially introduced into a laboratory kneader having a useful volume of about 250 ml. After addition of 33 parts of the optical brightener of formula (21) the paste was kneaded for 30 minutes at room temperature. A stiff yellowish green paste was obtained which could be very finely divided in an excess of water.

C. (Dispersion C)

A paste was manufactured in the same manner as in Instruction A, using the optical brightener of formula (22):

(22)

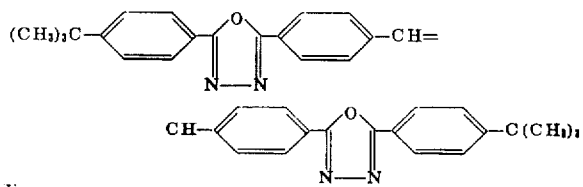

D. (Dispersion D)

A paste was manufactured in the same manner as in instruction B, using the optical brightener of formula 23:

(23)

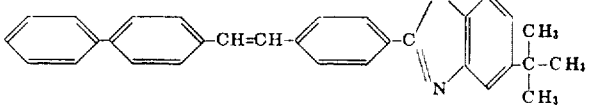

E. (Dispersion E)

A paste was manufactured in the same manner as in instruction A, using the optical brightener of formula (24):

(24)

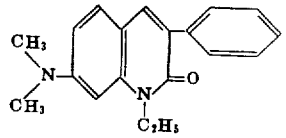

F. (Dispersion F)—A paste consisting of 2.5 parts of brightener of formula (25)

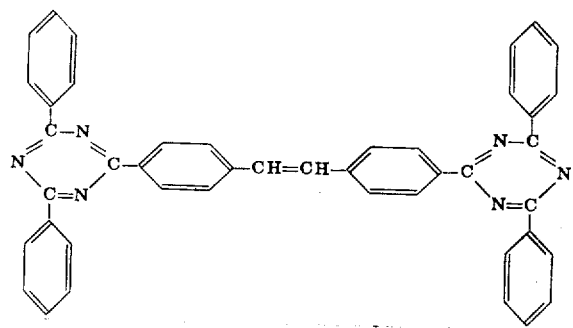

2.5 parts of a condensation product of 1 mol of oleylamine and 8 mols of ethylene oxide and 2.5 parts of water was ground on a paint grinding machine, analogously to the instruction for Dispersion A.

G. (Dispersion G)

A paste consisting of 1 part of a brightener of formula (26)

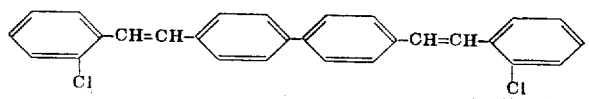

1.5 parts of an addition product of 1 mol of amine mixture (stearylamine, arachidylamine and behenylamine) and 30 mols of ethylene oxide, neutralized with acetic acid, and 0.5 part of water was ground in the same manner as in instruction A.

H. (Dispersion H)

A paste was manufactured in the same manner as in instruction G, using the brightener of formula (27)

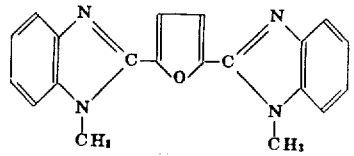

I. (Dispersion I)

A paste consisting of 2.5 parts of a brightener of formula (28)

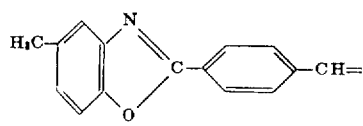

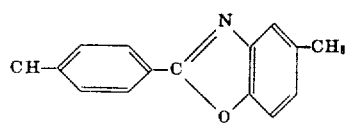

2.5 parts of a reactive surface-active agent from a condensation product of hexamethylolmelamine, n-butanol and polyglycol (compare French patent specification 1,381,811 or British patent specification 1,022,215) and 2.5 parts of water was ground in the same manner as in instruction A.

L. (Dispersion L)

A paste was manufactured in the same manner as in instruction G, using the brightener of formula (29)

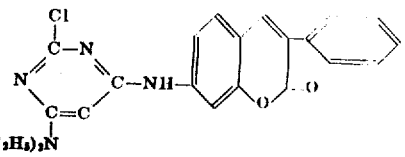

EXAMPLES OF PIGMENT PREPARATIONS

Example 1

20 parts of a titanium dioxide of the rutile modification, the surface of which had not been post-treated, 80 parts of water and 0.5 part of aluminum sulphate were initially introduced into a beaker and 1 part of dispersion A was added at room temperature while stirring. After the paste had become uniformly distributed over the course of 5 minutes, 50 ml of an 0.5 percent strength aqueous solution of sodium silicate were added dropwise over the course of 2 minutes with further stirring. The suspension was stirred for a further 10 minutes, and the pigment was isolated by filtration and eluted with deionised water on the filter. Drying was carried out for 2 hours under an infrared lamp, in the course of which the bulk of the water was removed, and subsequently for about 16 hours at 60° C. in a circulating air drying cabinet. The coarse powder was ground for 5 hours in a ball mill. The rutile preparation obtained in this manner contained 2.8 percent of the optical brightener of formula (21).

Example 2

A preparation of an optical brightener was manufactured in the same manner as in Example 1, but instead of one part, 5.0 parts of dispersion A were employed. The rutile preparation contained 12.5 percent of the optical brightener of formula (21).

Example 3

The same procedure as in Example 1 was followed, but instead of dispersion A 1.0 part of dispersion B was added. A rutile preparation containing 1.6 percent of the optical brightener of formula (21) was obtained.

Example 4

144 parts of water and 50 parts of a non-post-treated titanium dioxide of the rutile modification were initially introduced into a beaker and 1.5 parts of dispersion B were added whilst stirring. After a further 5 minutes' stirring the paste had become uniformly distributed, and 0.25 part of di-2-ethylhexyl adipate were added. After 20 minutes' further stirring the pigment was isolated by filtration, eluted with deionised water and dried for 2 hours at 160° C. The dry pigment was ground for 16 hours in a ball mill.

The rutile preparation manufactured in this way contained 1.0 percent of the optical brightener of formula (21).

Example 5

An analogous procedure to Example 1 was followed, merely employing 1 part of dispersion C in place of dispersion A. The rutile preparation contained 2.8 percent of the optical brightener of formula (22).

Example 6

Example 1 was repeated with dispersion D instead of dispersion A. A rutile preparation with 2.8 percent of the optical brightener of formula (23) was obtained.

Example 7

20 parts of a titanium dioxide of the anatase modification, the surface of which had not been post-treated, 80 parts of water and 0.5 part of aluminum sulphate were initially introduced into a beaker and 1 part of dispersion A was added with stirring. On further processing in the same way as in example 1, an anatase preparation was obtained which contained 2.8 percent of the optical brightener of formula (21).

Example 8

51 ml of an aqueous suspension of zinc sulphide, containing 500 g/l, and 3.8 ml of sodium silicate solution, containing 270 g/l of SiO$_2$, were initially introduced into a beaker and 1.3 g of dispersion B were added whilst stirring. After the dispersion of the optical brightener was uniformly distributed, 5.6 ml of a solution of CaCl$_2$ and AlCl$_3$, containing 66.7 g of CaCl$_2$ and 79.5 g of AlCl$_3$. 6 H$_2$O per liter were added dropwise over the course of 2 minutes, and stirring was continued for a further 10 minutes at room temperature. The pigment was subsequently isolated by filtration, eluted with deionised water and intensively mixed in a laboratory kneader for 15 minutes with 2.6 ml of an 0.1 molar phosphoric acid, with the pH value being adjusted to 6–7 with NH$_3$ solution.

After 10 hours' drying at 62° C. and 20 mm Hg a zinc sulphide preparation was obtained which contained 1.6 percent of the optical brightener of formula (21).

Example 9

An analogous procedure to Example 1 was followed, merely employing 1 part of dispersion E in place of dispersion A. The rutile preparation contained 2.8 percent of the optical brightener of formula (24).

Example 10

An analogous procedure to Example 1 was followed, merely employing, instead of dispersion A, 3.0 parts of a dispersion of analogous composition (about 27 percent of active substance) of an optical brightener of formula (31)

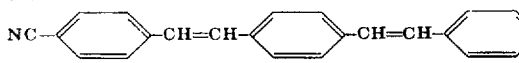

Example 11

The same procedure as in Example 4 was followed, with the difference that instead of 1.5 parts of dispersion B 2.5 parts of dispersion F were added and instead of di-2-ethylhexyl adipate di-2-ethylhexyl phthalate was added.

Example 12

The same procedure as in Example 1 was followed, with the difference that instead of dispersion A 1 part of dispersion G was added and that the resulting dry powder was ground for 12 hours in a ball mill with 1 percent of triethanolamine.

Example 13

The same procedure as in Example 14 was followed, with the difference that instead of TiO$_2$-rutile, ZnO was added, instead of dispersion G, dispersion H was added, and instead of triethanolamine, triethanolamine sulphate was added.

Example 14

The same procedure as in Example 4 was followed, with the difference that instead of 1.5 parts of dispersion B, 7.5 parts of dispersion I were added, and instead of 0.25 part of di-2-ethylhexyl adipate, 0.75 part of acetylacetone was added.

Example 15

The same procedure as in Example 4 was followed, with the difference that instead of 1.5 parts of dispersion B, 2.5 parts of dispersion K were added, and instead of 0.25 part of di-2-ethylhexyl adipate a solution rendered alkaline (pH 10.5) with NaOH and containing 0.5 part of olein in 125 parts of water was added.

Example 16

The same procedure as in Example 1 was followed, with the difference that instead of dispersion A, 1 part of dispersion L was added and that the dry powder was ground for 12 hours in a ball mill with 1 percent of acetal — manufactured according to Instruction B of U.S. patent specification 3,198,647.

USE EXAMPLES

The industrially extremely interesting use of the preparations which have been described can be seen from the examples which follow.

In order to assess the brightening effect achieved, a "white scale," specially developed for the visual comparison of brightened samples, and described in "Textilveredlung" ("Textile Finishing"), March 1968, pages 116 to 124, was employed.

EXAMPLE I

A sheet of plasticized polyvinyl chloride (PVC: plasticizer = 65:35), with the white pigment additions which can be seen from the table below, is manufactured on a laboratory two-roll mixer in the usual manner. The ratings determined by visual checking of samples against the white scale referred to, characterize the degree of whiteness of the sheets.

| Sample | Concentration | White Pigment | White Scale Rating |
|---|---|---|---|
| 1 | 2.0% | Rutile comparison preparation without brightener | 80 |
| 2 | 2.0% | Rutile preparation according to Example 3 | 145 |
| 3 | 1.0% | Rutile comparison preparation and | |
|  | 1.0% | Rutile preparation according to Example 3 | 130 |
| 4 | 1.5% | Rutile comparison preparation and | |
|  | 0.5% | Rutile preparation according to Example 3 | 115 |
| 5 | 5.0% | Rutile comparison preparation without brightener | 95 |
| 6 | 5.0% | Rutile preparation according to Example 3 | 155 |
| 7 | 2.5% | Rutile comparison preparation and | |
|  | 2.5% | Rutile preparation according to Example 3 | 125 |
| 8 | 2.0% | Rutile preparation according to Example 9 | 180 |
| 9 | 1.0% | Rutile comparison preparation and | |
|  | 1.0% | Rutile preparation according to Example 9 | 150 |
| 10 | 2.0% | Rutile preparation according to Example 10 | 160 |
| 11 | 1.0% | Rutile comparison preparation and | |
|  | 1.0% | Rutile preparation according to Example 10 | 150 |
| 12 | 2.0% | ZnS comparison preparation without brightener | 95 |
| 13 | 2.0% | ZnS preparation according to Example 8 | 190 |

EXAMPLE II

A mixture of 48 g of an acrylonitrile-butadiene-styrene copolymer ("Terluran 877", registered tradename Badische Anilin- & Soda-Fabrik) and 2.0 g of a white pigment was homogenized for 5 minutes at 170° to 175° C. roll temperature on a laboratory two-roll mixer. 1 mm thick sheets were obtained by pressing for 5 minutes in a suitable mould at 170° C., and the degree of whiteness of these sheets was determined by visual comparison against the white scale mentioned.

| Sample | Concentration | White Pigment | White Scale Rating |
|---|---|---|---|
| 14 | 2.0% | Rutile comparison preparation without brightener | 20 |
| 15 | 2.0% | Rutile preparation according to Example 5 | 65 |

EXAMPLE III 100 parts of polyester granules (Arnit G 600, AKU) were mixed dry with 2 parts of the preparation according to Example 11 and processed into 2 mm thick small sheets on a screw-type injection moulding machine at 260° C.

The degree of whiteness of the resulting small sheets was determined by visual comparison against the white scale mentioned.

| Sample | Concentration | White Pigment | White Scale Rating |
| --- | --- | --- | --- |
| 16 | 2.0% | Rutile comparison preparation without brightener | 60 |
| 17 | 2.0% | Rutile preparation according to Example 11 | 140 |

EXAMPLE IV 100 parts of polyamide (Ultramid B3K, BASF) were dissolved in 999 parts of trifluorethanol at 73° C. and stirred with 0.6 part of the preparation according to Example 12, which had beforehand been ground with 1 part of trifluorethanol on a paint grinding machine. The mixture was then cast on a glass plate, where the solvent evaporated at room temperature and the plastic solidified as a film.

The degree of whiteness of the film was determined by visual comparison against the white scale mentioned.

| Sample | Concentration | White Pigment | White Scale Rating |
| --- | --- | --- | --- |
| 18 | 2 % | Rutile comparison preparation without brightener | 60 |
| 19 | 2 % | Rutile preparation according to Example 12 | 140 |

EXAMPLE V 60 parts of polyacrylonitrile (LEACRYL, ACSA) were dissolved in 442 parts of dimethylformamide at 60° C. whilst stirring, and stirred up with 1.8 parts of the preparation according to example 13, which had beforehand been ground with 2 parts of dimethylformamide on a paint grinding machine.

The mass was then spread on a glass plate by means of a film-drawing rod (0.5 mm layer thickness) and dried for 30 minutes at 120° C. and 20 mm Hg.

The degree of whiteness of the resulting film was determined by visual comparison against the white scale mentioned.

| Sample | Concentration | White Pigment | White Scale Rating |
| --- | --- | --- | --- |
| 20 | 3 % | ZnO comparison preparation without brightener | 30 |
| 21 | 3 % | ZnO preparation according to Example 13 | 50 |

EXAMPLE VI 40 parts of polyethylene (Alkathene WNG 14, ICI) were mixed dry with 0.8 part of the preparation according to Example 14, calendered on a laboratory mill for 5 minutes at 140° C., and then pressed into 1 mm thick sheets in a press at 150° C. and 30 kg/cm² pressure.

The degree of whiteness of the resulting sheet was determined by visual comparison against the white scale mentioned.

| Sample | Concentration | White Pigment | White Scale Rating |
| --- | --- | --- | --- |
| 22 | 2 % | Rutile comparison preparation without brightener | 90 |
| 23 | 2 % | Rutile preparation according to Example 14 | 140 |

EXAMPLE VII 0.6 part of the preparation according to Example 15 was manually triturated with 5 parts of tetrachlorethylene in a mortar. This suspension was then mixed with a solution of 30 parts of polystyrene (Lustrex HF 55, Monsanto) in 195 parts of tetrachloroethylene. The mass was then spread on a glass plate by means of a film-drawing rod (layer thickness 0.5 mm) and dried at room temperature.

The degree of whiteness of the resulting film was determined by visual comparison against the white scale mentioned.

| Sample | Concentration | White Pigment | White Scale Rating |
| --- | --- | --- | --- |
| 24 | 2 % | Rutile comparison preparation without brightener | 80 |
| 25 | 2 % | Rutile preparation according to Example 15 | 150 |

EXAMPLE VIII 100 parts of cellulose acetate (Cellidor AM, BAYER) were mixed dry with 2 parts of pigment preparation according to example 16, calendered for 5 minutes on a mixing roll, and then pressed into 1 mm thick sheets on a press at 150° C. and 30 kg/cm² pressure.

The degree of whiteness of the resulting sample was determined by visual comparison against the white scale mentioned.

| Sample | Concentration | White Pigment | White Scale Rating |
| --- | --- | --- | --- |
| 26 | 2 % | Rutile comparison preparation without brightener | 60 |
| 27 | 2 % | Rutile preparation according to Example 16 | 90 |

EXAMPLE IX

A mixture consisting of 20 parts of rubber, 1 part of di-2-ethylhexyl phthalate, 0.2 part of p-phenylenediamine, 1 part of ZnO, 0.3 part of mercaptobenzthiazole, 0.3 part of sulphur and 3 parts of preparation according to example 1 was mixed for 30 minutes on a two-roll mill at 60° C. and then vulcanized for 20 minutes in a press at 140° C. and 50 kg/cm² pressure.

The degree of whiteness of the 1 mm thick sheet was determined by visual comparison against the white scale mentioned.

| Sample | Concentration | White Pigment | White Scale Rating |
| --- | --- | --- | --- |
| 28 | 15 % | Rutile comparison preparation without brightener | 30 |
| 29 | 15 % | Rutile preparation according to Example 1 | 50 |

EXAMPLE X

A coating composition consisting of 40 parts of a 30 percent strength solution of a polyol (polyester-based) in ethyl acetate (Impranil CHW, BAYER), 2 parts of 75 percent strength polyisocyanate in ethyl acetate (Imprafix TH, BAYER), 2 parts of a 10 percent strength solution of a suitable accelerator in a mixture of ethyl acetate and ethylene chloride (Imprafix BE, BAYER) and 2 parts of a paste of 60 percent of the preparation according to Example 1 and 40 percent of di-2ethylhexyl phthalate was doctored onto bleached cotton fabric (wet film thickness 0.5 mm) and dried at room temperature.

The degree of whiteness of the coating was determined by visual comparison against the white scale mentioned.

| Sample | Concentration | White Pigment | White Scale Rating |
|---|---|---|---|
| 30 | 3 % | Rutile comparison preparation without brightener | 60 |
| 31 | 3 % | Rutile preparation according to Example 1 | 100 |

EXAMPLE XI

A mixture consisting of 75 parts of nitro lacquer (30 percent solids content) and 12 parts of the preparation according to Example 1 was ground for 24 hours in a ball mill, then diluted to a spraying viscosity with 13 parts of nitro thinner and applied to cardboard by means of a spray gun. Drying at room temperature.

Lacquer ratios:
Binder : pigment : solvent = 22.5 : 12.0 : 65.5
Binder : pigment = 65.2 : 34.8

The degree of whiteness of the dry paint film was determined by visual comparison against the white scale mentioned.

| Sample | Concentration | White Pigment | White Scale Rating |
|---|---|---|---|
| 32 | 34.8 % | Rutile comparison preparation without brightener | 80 |
| 33 | 34.8 % | Rutile pigment preparation according to Example 1 | 110 |

We claim:

1. Process for the manufacture of preparations of inorganic white pigments by precipitation of property-improving auxiliary agents onto the white pigments, separation of the pigment so treated from the aqueous phase, washing and drying, characterized in that a) optical brighteners having a solubility in water of less than 0.5 part by weight per 100 parts by weight of water are dispersed with non-ionic surface active agents in an aqueous medium in an amount of 0.1 to 15 percent by weight, calculated on the amount of pigment, b) these dispersions are mixed with an aqueous suspension of an inorganic white pigment selected from the group consisting of titanium dioxide (rutile and anatase), zinc sulphide, zinc oxide, zirconium oxide, aluminum oxide, silicon dioxide, barium sulphate, magnesium oxide, calcium sulphate, calcium carbonate and their mixtures with the white pigment suspension optionally containing components for the formation of property-improving auxiliary substances if formation of such property-improving substances requires several components, and c) the property-improving auxiliary substances are precipitated or adsorbed in the mixture thus obtained either by admixing a property-improving auxiliary substance or by admixing a further component for the formation of such a property-improving auxiliary substance if one component for the formation of such an auxiliary substance has already been admixed to the optical brightener/pigment dispersion.

2. Process according to claim 1 characterized in that, as property-improving auxiliary agents, those of the group of the silicates or phosphates, oxides and/or hydrated oxides of aluminum, zinc, magnesium, silicon or titanium, of an epoxide compound or of a diester of a saturated aliphatic dicarboxylic acid, alkanolamines, soaps, diketone compounds, polyacetals, dibasic carboxylic acids or reactive surface-active agents are used.

3. Process according to claim 1 characterized in that aluminum silicates which are produced by precipitation of sodium silicate with aluminum sulfate, or dialkyl esters of aliphatic saturated dicarboxylic acids, are used as property-improving auxiliary agents.

4. Process according to claim 1 characterized in that titanium dioxide or zinc oxide are used as inorganic white pigments.

5. Process according to claim 1 characterized in that the optical brightener is dispersed with non-ionic surface-active agents from the group of the polyoxalkylation products of aliphatic monohydric alcohols or aliphatic amines, in each case having up to 24 carbon atoms, or of alkyl-substituted phenols.

6. Process according to claim 1 characterized in that compounds of the group of the bis-benzoxazolyl-thiophenes, p,p'-bis-(5-phenyl-1,3,4-oxdiazol-2-yl)-stilbenes, p-phenyl-p'benzoxazolyl-stilbenes, 3-phenyl-carbostyrl derivatives, 1,4-bis-styrylbenzenes, bis-triazinyl-stilbenes, bis-styryl-diphenyl derivatives, di-benzimidazolyl-furanes, bis-benzoxazolyl-stilbenes, stilbenyl-naphthotriazoles and 3-phenyl-7-triazinyl-coumarines are used as optical brighteners.

7. Process according to claim 1 characterized in that a) optical brighteners having a solubility in water of not more than 0.5 part by weight per 100 parts by weight of water are dispersed in an aqueous medium by means of ethers of polyhydroxy compounds as non-ionic wetting agents, b) this dispersion is mixed with an aqueous suspension of titanium dioxide or zinc sulphide which can optionally contain usual components for property-improving auxiliary substances, and c) property-improving auxiliary substances are precipitated in this mixture if required after addition of further auxiliary substance components.

8. Process according to claim 1 characterized in that a) an optical brightener of the group of bis-benzoxazolyl-thiophenes, p,p'-bis-(5-phenyl-1,3,4-oxdiazol-2-yl)-stilbenes, p-phenyl-p'-benzoxazolyl-stilbenes, 3-phenyl-carbostyryl derivatives and 1,4-bis-styrylbenzenes, having a solubility in water of less than 0.5 part by weight per 100 parts by weight, is dispersed in an aqueous medium by means of a polyalkoxylation product of a hydroxy compound as a non-ionic wetting agent, b) this dispersion is mixed with an aqueous suspension of titanium dioxide which can optionally contain components for the property-improving auxiliary substances which are to be used, and c) property-improving auxiliary substances of the group of the silicates, phosphates, oxides and/or hydrated oxides of aluminum, zinc, magnesium, silicon or titanium, of an epoxide compound or of a diester of a saturated aliphatic dicarboxylic acid are precipitated in this mixture.

* * * * *